(12) United States Patent
Circenis

(10) Patent No.: US 7,287,277 B2
(45) Date of Patent: Oct. 23, 2007

(54) METHOD AND APPARATUS FOR CONTROLLING EXECUTION OF A COMPUTER OPERATION

(75) Inventor: Edgar Circenis, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1004 days.

(21) Appl. No.: 10/023,811

(22) Filed: Dec. 21, 2001

(65) Prior Publication Data

US 2003/0135750 A1    Jul. 17, 2003

(51) Int. Cl.
G06F 7/04 (2006.01)
G06F 7/58 (2006.01)
G06F 12/00 (2006.01)
G06K 19/00 (2006.01)
G11C 7/00 (2006.01)
H04L 9/32 (2006.01)

(52) U.S. Cl. .......................... 726/21; 726/4; 719/320; 709/225; 713/192; 713/170

(58) Field of Classification Search ................ 713/200, 713/201, 182; 709/225; 705/26; 726/21
See application file for complete search history.

(56) References Cited

U.S. PATENT DOCUMENTS

| | | | |
|---|---|---|---|
| 6,094,684 A * | 7/2000 | Pallmann | 709/227 |
| 6,539,427 B1 * | 3/2003 | Natarajan et al. | 709/224 |
| 6,633,872 B2 * | 10/2003 | Ambrosini et al. | 707/9 |
| 6,694,312 B2 * | 2/2004 | Kobayashi et al. | 707/4 |
| 6,842,903 B1 * | 1/2005 | Weschler | 719/328 |
| 6,857,067 B2 * | 2/2005 | Edelman | 713/155 |
| 6,996,832 B2 * | 2/2006 | Gunduc et al. | 719/331 |
| 2001/0047275 A1 * | 11/2001 | Terretta | 705/1 |
| 2002/0016915 A1 * | 2/2002 | Kumazawa et al. | 713/176 |
| 2002/0147801 A1 * | 10/2002 | Gullotta et al. | 709/223 |
| 2002/0174023 A1 * | 11/2002 | Grey et al. | 705/26 |
| 2002/0178377 A1 * | 11/2002 | Hemsath et al. | 713/201 |
| 2003/0097445 A1 * | 5/2003 | Todd et al. | 709/226 |

* cited by examiner

*Primary Examiner*—Emmanuel L. Moise
*Assistant Examiner*—Shewaye Gelagay

(57) ABSTRACT

Computer operations whose execution would increase usage costs may require use of authorization and notification plug-ins to prevent unauthorized execution. The command may be designed to only execute properly if the authorization and notification plug-ins are properly registered. The computer system customer designs the authorization and notification plug-ins based on standard application programming interfaces to suit the customer's business practices and links them to the computer operation. The computer operation executes the authorization plug-in to determine if the proper authorization plug-in parameters have been specified and verify that the command is authorized. If authorization is granted, the computer operation checks to see that the notification plug-in is given the correct parameters, executes the computer operation, and then executes the notification module to notify the necessary personnel. Both authorization and notification plug-ins return errors that are passed to the user through the computer operation.

21 Claims, 4 Drawing Sheets

METHOD AND APPARATUS FOR CONTROLLING EXECUTION OF A COMPUTER OPERATION

TECHNICAL FIELD

The technical field is the dynamic purchasing of computer processor power and in particular, the management and control of capacity-on-demand purchasing.

BACKGROUND

The emergence of instant capacity-on-demand (iCOD) high-end computers has provided corporations, enterprises, and other users with great flexibility in paying for and purchasing high-end multiprocessor computers. A customer can purchase a high-end iCOD computer or server with multiple central processing units (CPUs) yet pay a reduced price by activating only some of the CPUs. The remaining CPUs remain inactive and are not licensed for use until the inactive CPUs are activated. In this way, the customer can save money by initially paying a system vendor for only the CPUs that are required at the time of purchase, while retaining the ability to instantly activate CPUs in the future. The customer merely needs to activate additional CPUs with system administration commands and to pay additional licensing fees for activating the additional CPUs. The iCOD computer customer can effectively add CPUs to the iCOD system without needing to purchase or install any additional CPUs.

The iCOD computer or server measures the total number of CPUs that are currently on the iCOD computer and the number of CPUs that are currently inactive and periodically reports these measurements back to the system vendor. The system vendor then determines if there are any unlicensed CPUs, where the customer has activated iCOD CPUs without paying, and notifies the customer that payment is required. The iCOD CPU may be priced at market rate at the time of activation, and the iCOD customer is able to easily activate capacity and then pay for the iCOD CPU.

This model of iCOD CPU activation followed by payment creates administrative problems for many customers, especially larger and more bureaucratic organizations. The person who activates additional iCOD CPUs is typically either a low-level system operator or a system administrator who may work for a different organization than that of the persons or departments that oversee the budgets. The system administrator may also work for a different group than system planners authorized to make decisions on the computer configuration. The system administrator or operator may not even be employed by the same corporation as that of the system architecture, planning, or purchasing departments, because the system administration may have been outsourced. This disconnect between the persons activating additional iCOD CPUs and the persons overseeing or paying for the additional iCOD CPUs frequently results in system administrators activating iCOD CPUs—and effectively making a substantial purchase under the iCOD agreement—without first seeking approval from the customer's budgetary, system architecture or other designated authorizing parties. These authorizing parties, moreover, are not notified of this purchase until a bill or payment reminder issues from the system vendor, which usually occurs well after the system capacity was increased and put into use.

Vendors, such as Hewlett Packard, currently request that customers designate a "system contact" to be notified of any system changes, such as the activation of additional iCOD CPUs, so that someone in the customer's organization is informed of such changes. Even this solution, however, is far from foolproof because the system contact given to the vendor may in fact be the system administrator or operator, particularly if only one system contact is required. Moreover, merely notifying the system contact after activation still may prove problematic even if the correct person is notified because the system administrator could still activate an iCOD CPU and effectively make a substantial purchase without prior authorization.

SUMMARY

A system for providing business control over the activation and de-activation of cost-based computer capacity, such as iCOD CPUs or hard disk capacity, is specified. Computer operations that may require seeking authorization and that may require notifying certain designated parties may be designed so that they must be run with authorization and notification plug-ins. A customer may design the customer's own authorization and notification plug-ins to suit the customer's business practices, including designating who is permitted to authorize such iCOD purchases and designating who must be notified in the event of any change. The customer may ensure that the plug-ins comply with the application programming interfaces (APIs) for each of the modules, so that the computer operation can pass data parameters to and from the plug-ins. The computer operation registers these plug-ins prior to the first operation of the computer operation.

The computer operation may run the authorization plug-in to seek authorization for the command prior to executing the substantive computer operation code, and in doing so, may follow the customer's customized authorization protocol. The computer operation executes the computer operation code if the authorization plug-in returns an authorization, but will terminate if no authorization is given. Once the computer operation code has been executed, the computer operation runs the notification plug-in and notifies the designated patties that the computer operation has been executed. The computer operation checks that the proper parameters are present for both of these plug-ins prior to running each respective plug-in and will terminate in error if the proper parameters are not present. Any messages returned by the computer operation code may also be forwarded to the notified parties. In this way the customer now may implement his own business practices in controlling the use of these iCOD computer operations.

DESCRIPTION OF THE DRAWINGS

The detailed description will refer to the following drawings, wherein like numerals refer to like elements, and wherein:

FIG. 2 is a flowchart illustrating one embodiment of the interaction between the computer operation and an authorization plug-in and a notification plug-in;

FIG. 3 is a flowchart illustrating the steps executed by the authorization plug-in; and FIG. 4 is a flowchart illustrating the steps executed by the notification plug-in.

DETAILED DESCRIPTION

A system is disclosed that would give a customer the capability to add either authorization or notification controls, or both, to a computer operation. The controls may check that all authorization and notification data, such as authorizing parties or parties to be notified, are specified prior to running the controls. The authorization control may determine whether the computer operation were authorized. The computer operation then executes if authorized and the notification control may notify any parties after the computer operation executes.

How each control is implemented, however, depends highly on the customer's own internal business controls. Different customers will choose to implement different authorization and notification controls, and some customers may choose to implement to omit either the authorization control or the notification control, or both. A flexible approach is needed so that different customers can design and customize authorization and notification controls to suit their business needs.

Figure 1:
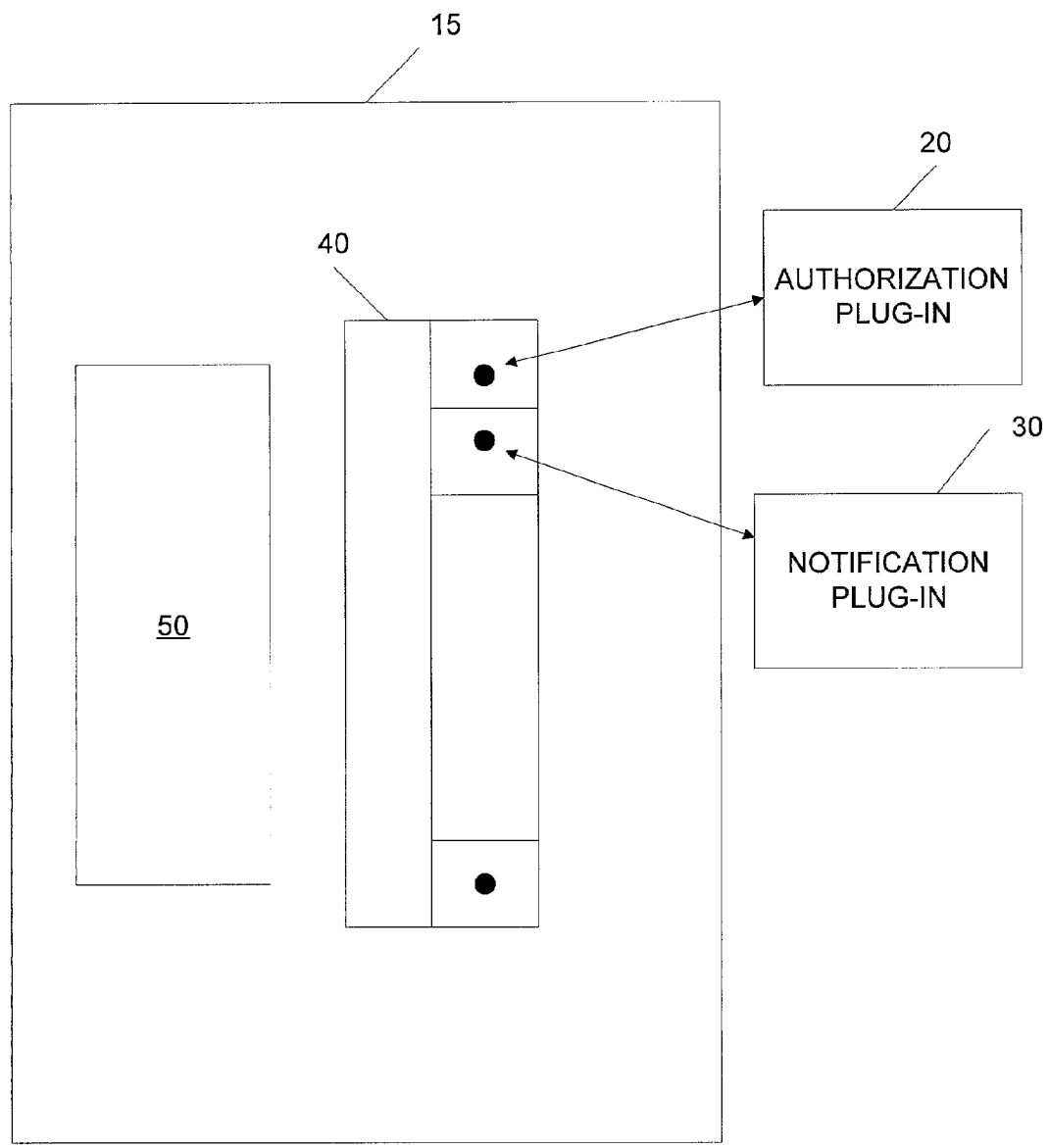
FIG. 1 illustrates a computer operating with a computer operation having computer operation code along with customer business controls.

Plug-ins, which may be implemented as an executable, a library function, or a script, may be used to implement these controls to regulate execution of certain computer operations. FIG. 1 illustrates a computer 10 whose operating system includes a computer operation 15, an authorization plug-in 20, and a notification plug-in 30. The authorization and notification plug-ins 20, 30 are implemented to prevent unauthorized or un-notified execution of the computer operation 15. The computer operation 15 may include computer operation code 50 for a system function and may come from a system vendor (e.g. an HP-UX command) as part of a release of the operating system for the computer 10, where the computer operation code 50 performs the actual system function. The computer operation 15 could perform any system function that the customer or system vendor deems as needing regulation, though generally the computer operation 15 that is being regulated would cost the customer additional money, or otherwise have a financial consequence, if executed.

The computer operation 15 may be developed and distributed to the customer with no plug-ins or other controls, other than an application programming interface (API) for communicating with plug-ins developed by the customer. The customer can then decide on how to modify the computer operation 15 before internally distributing the computer operation 15 to all of the customer's computers—typically the customer will have a plurality of computers. The customer is, in fact, free to distribute the computer operation 15 without any additional plug-ins, in which case the computer operation 15 will execute without plug-ins at all. However, distributing a computer operation 15 without plug-ins would basically allow for any system administrator to execute the computer operation 15 without requiring any authorization or notification.

The customer, and often, the customer's system architecture groups, may first modify the computer operation 15 prior to distributing the computer operation 15 to all of the computers 10. Customers deciding to implement controls over the computer operation 15 may design and develop their own authorization and notification plug-ins 20, 30. The authorization plug-in 20 and notification plug-in 30 are both "registered" with the computer operation 15 so that the computer operation 15 will know where to access the authorization and notification plug-ins 20, 30 on the computer 10. The files containing the authorization and notification plug-ins 20, 30 would preferably be located in either a system directory for plug-ins or in some other dedicated directory. Another possible location would be a directory structure reserved for customer-installed operations. The computer operation 15 would be placed in the directories for system functions, and the location for the authorization and notification plug-ins 20, 30 would be stored in a registry 40 that the computer operation 15 could read. The registry 40 may be located within the computer operation 15 or it may be part of a preference file read by the computer operation 15.

The authorization and notification plug-ins 20, 30 may use certain information, such as authorizing party or party to be notified, to perform either authorization or notification. The information may be conveyed to the plug-ins 20, 30 in the form of parameters, although the information may also be conveyed as environment variables. The computer operation 15 may be designed so that parameters may be specified by a system administrator, operator, or other user of the computer operation 15, where the authorization and notification plug-ins 20, 30 would read the parameters required for each plug-in. However, the computer operation vendor does not know what parameters will be required by the plug-ins, because the customer, and often the customer's system planning or architecture groups, rather than the computer operation vendor, may design and develop the plug-ins. The plug-ins 20, 30 may also be designed to not require plug-in parameters. Consequently, the computer operation 15 may permit generic parameters to be passed through directly to the authorization and notification plug-ins 20, 30. If the computer operation 15 were executed using a UNIX command line, for example, the computer operation 15 may be designed with an "-x" option, so that any text following an "-x" option may automatically be passed to the authorization and notification plug-ins 20, 30 as a generic plug-in parameter. Multiple "-x" parameters may be passed with one command. A similar field or window may be added if the computer operation 15 were implemented as a graphical user interface (GUI).

The computer operation 15 does not parse these plug-in parameters other than to separate them from specific computer operation parameters used by the computer operation 15. Rather, the computer operation 15 simply passes the plug-in parameters through to the authorization and notification plug-ins 20, 30, which look for particular parameter names specific to each plug-in. Some parameter names, such as persons to be notified, may be required and used by both the authorization plug-in 20 and the notification plug-in 30. The possibility of a conflict among parameter names is reduced because customers design or at least customize both plug-ins prior to use.

The customer may design the specific actions or sequence of actions performed by the authorization and notification plug-ins 20, 30, and may tailor these plug-ins and their parameters for the customer's business or organizational set-up. The authorization plug-in 20 and notification plug-in 30 may be implemented as either shared library functions that are dynamically linked at runtime or as separate commands, including as command scripts. The authorization and notification plug-ins 20, 30 are also generally required to adhere to an application programming interface (API). This plug-in API would typically specify that the plug-ins 20, 30 read in generic plug-in parameters from the computer operation 15 and would further specify that the plug-ins 20, 30 return either a "success" or "failure" signal when the plug-in terminates. Success or failure signals may be implemented as exit values if the authorization and notification plug-ins 20, 30 were C functions or UNIX commands. The API may further require that the authorization and notification plug-ins 20, 30 return a data structure for indicating what parameters are missing.

In addition, the authorization and notification plug-ins 20, 30 may have two modes of operation: a "check" mode and an "execute" mode. In the check mode, the plug-in does not execute the substantial plug-in function (i.e. authorization or notification), but checks to see whether the parameters required for the given plug-in have been supplied or specified. In the execute mode, by contrast, the plug-in performs or executes the plug-in's substantial function (i.e. authorization or notification). The plug-in then may be run in the check mode prior to running the plug-in in the execute mode, so that the plug-in will be executed with the required parameters.

The authorization and notification plug-ins 20, 30 must first be registered with the computer operation 15 before the computer operation 15 will invoke the plug-ins 20, 30. Registration provides the location of the plug-ins 20, 30 to the computer operation 15, and places this information in the registry 40. (As noted above, the registry 40 may be a separate preference file or the registry may be embodied in the computer operation 15). The actual registration may be implemented in the computer operation 15, so that one would execute the computer operation 15 with a "registration" option, where one could specify the file locations or path of the plug-ins 20, 30. Alternately, the computer operation 15 could be designed to automatically register plug-ins 20, 30 found in a default path. Plug-in registration could also be implemented as a registration command or command script separate from the computer operation 15.

Similar commands or options could be used to un-register the authorization or notification plug-ins 20, 30, in the event one wanted to update or modify the plug-ins. However, the un-registration command itself would require calling the currently registered authorization and notification plug-ins 20, 30. Requiring authorization for un-registering the authorization or notification plug-ins 20, 30 would prevent a system administrator or operator from replacing the existing authorization or notification plug-ins 20, 30 with the administrator's own controls or removing the authorization or notification plug-ins 20, 30 altogether.

Figure 2:
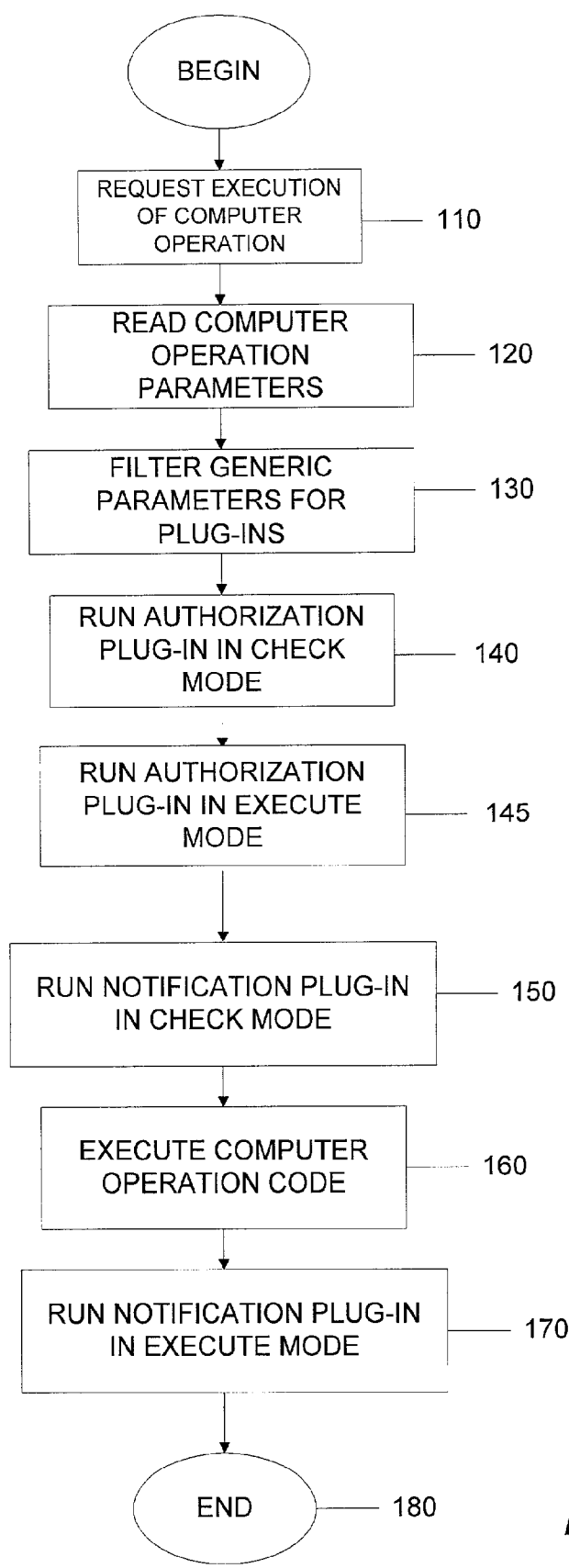

FIG. 2 illustrates the interaction in one embodiment of the computer operation 15 with registered authorization and notification plug-ins 20, 30. Execution of the computer operation 15 may be requested by a entering the name of the computer operation 15 in a command-line interface (CLI) or by using a GUI (step 110), with the command 15 reading whatever parameters are specified (step 120). The computer operation 15 then checks whether or not the option or parameter specified is a parameter for the computer operation 15 or a plug-in parameter for the plug-ins 20, 30 (step 130). Plug-in parameters are identified as such to the computer operation 15 and are not interpreted by the computer operation 15, because the computer operation 15 was designed with no specific knowledge regarding the plug-ins 20, 30. Rather, these plug-in parameters will simply be passed through to the respective authorization and notification plug-ins 20, 30; each plug-in will know what, if any, parameters are required by that plug-in. The computer operation 15 then runs the authorization plug-in 20 in check mode by either executing or dynamically linking the authorization plug-in 20, and specifically passes through all of the authorization plug-in parameters to the plug-in 20, as well as a flag indicating that the plug-in 20 is to be run in check mode (step 140).

Figure 3:
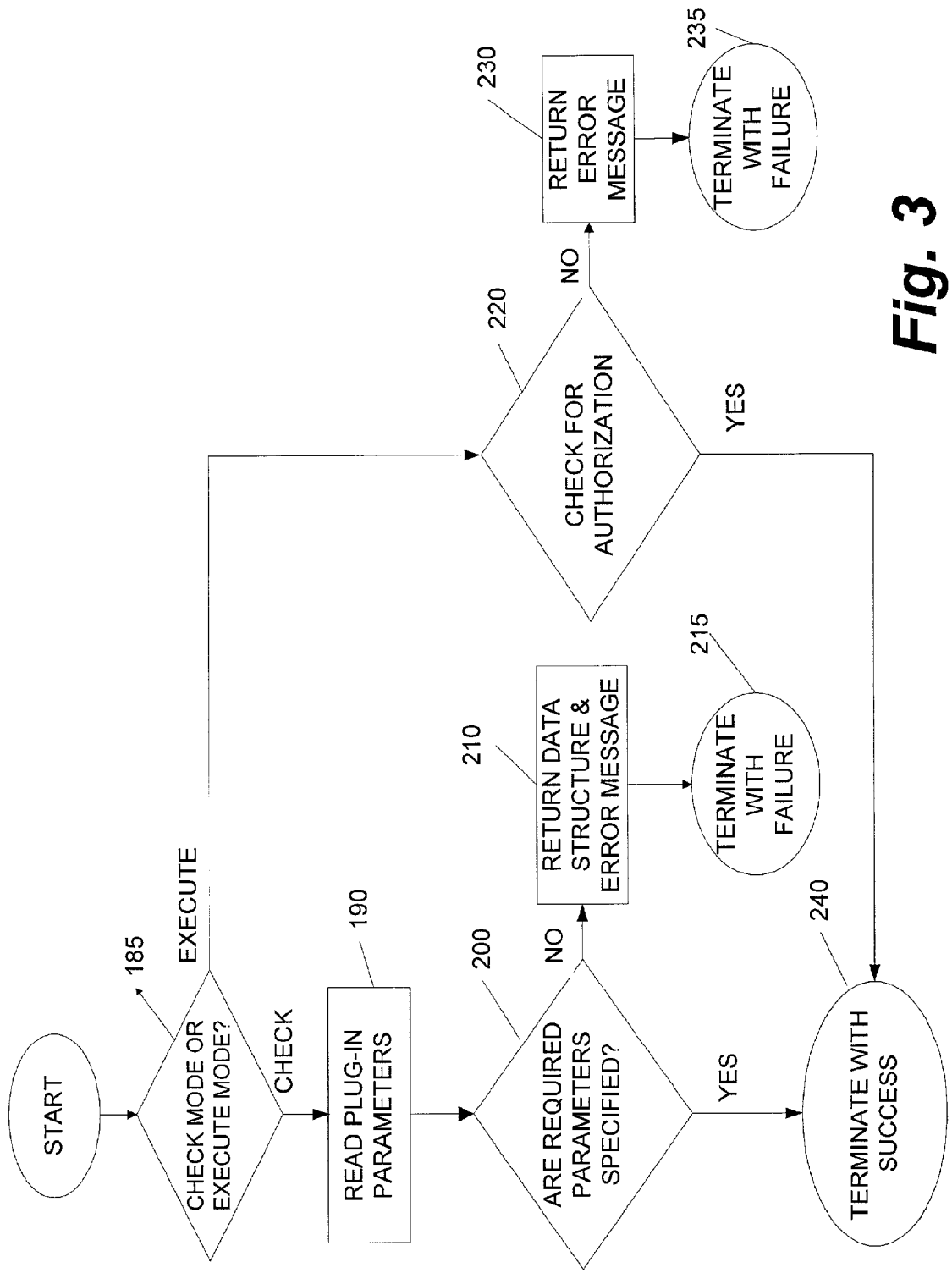

Execution of the authorization plug-in 20 in check mode will be described with respect to FIG. 3. The authorization plug-in 20 first determines whether the plug-in is being run in check mode or execute mode (step 185). If the authorization plug-in 20 were being run in check mode, the authorization plug-in 20 reads the generic plug-in parameters that are passed through the computer operation 15 (step 190). The authorization plug-in 20 checks whether all of the required authorization plug-in parameters are included in the parameters that were passed from the computer operation (step 200). If all of the required authorization plug-in parameters are present, the authorization plug-in 20 merely terminates with success, ending the check mode (step 240). On the other hand, if any required parameters are missing, the authorization plug-in 20 may return an error message and may also return a data structure indicating what parameters are missing (step 210). The error message passes through the computer operation 15 to the user and may include information on missing parameters or correct syntax in order to allow the user to correct the error. The computer operation 15 knows no specifics about the authorization plug-in 20, except whether the authorization plug-in 20 terminates in success or failure. The computer operation 15 thus passes through any error messages received from the authorization plug-in 20 to the user. The authorization plug-in 20 then terminates with failure, for example, by returning an exit value of −1 as is done by some C functions, or by a numerical code that indicates failure (step 215).

Once the authorization plug-in 20 returns to the computer operation 15 after terminating with failure, the computer operation 15 will know that the authorization plug-in 20 is missing certain parameters from the termination with failure signal and the returned data structure. The computer operation 15 may display the textual error message that was passed from the authorization plug-in 20. The computer operation 15 may actively prompt the user to enter the missing parameters or may simply terminate after displaying the missing parameters (in which case the user would re-execute the computer operation). The user of the computer operation is thus apprised of which authorization plug-in parameters are missing and can try and enter the proper parameters.

Returning to FIG. 2, assuming the authorization plug-in 20 has successfully found all plug-in parameters required for the authorization plug-in 20, the computer operation runs the authorization plug-in 20 in execute mode (step 145). It is possible to combine both steps into a "full execute" mode for the authorization plug-in 20, as well.

Returning to FIG. 3, the authorization plug-in 20 is now run in execute mode. The plug-in 20 first determines whether the plug-in 20 is being run in check mode or execute mode (step 185). If the authorization plug-in 20 is run in execute mode, the authorization plug-in 20 proceeds to check for authorization to execute the computer operation 15, reading the authorization plug-in parameters as necessary (step 220). The customer designs the particular mechanisms for obtaining authorization to suit the customer's needs. One example of obtaining authorization would be to require the user or system administrator to enter a key code parameter that is provided to the user or administrator by the customer's authorizing parties, and to deny authorization in the absence of the correct key code parameter. The authorization plug-in 20 will display an error message, which may be in text format, if authorization is denied (step 230); the authorization plug-in 20 will terminate with failure once the error message is displayed (step 235). Terminating with failure or success will be conveyed to the computer operation 15 instructing the computer operation 15 to either continue or terminate. The error message, however, will be passed through to the user by the computer operation 15 without modification, so that the user (i.e., the system operator) will know why authorization failed. If the authorization were granted, on the other hand, the authorization plug-in 20 will simply terminate with success and return to the computer operation 15 (step 240).

Returning to FIG. 2, assuming authorization was granted, the computer operation 15 then proceeds to call the notification plug-in 30 in check mode (step 150). The computer operation 15 runs the notification plug-in 30 in check mode before executing the computer operation code 50 and in execute mode after executing the computer operation code 50. Notification takes place after the computer operation code 50 is executed, but the computer operation 15 checks that the correct parameters are specified before actually executing the computer operation code 15. The computer operation 15 passes a flag to the notification plug-in 30 indicating which mode the notification plug-in 30 is being called in. Checking for parameters prior to execution of the computer operation code 50 ensures that the proper persons and other notification information are specified before execution, rather than checking only after the computer operation code 50 is executed.

Figure 4:
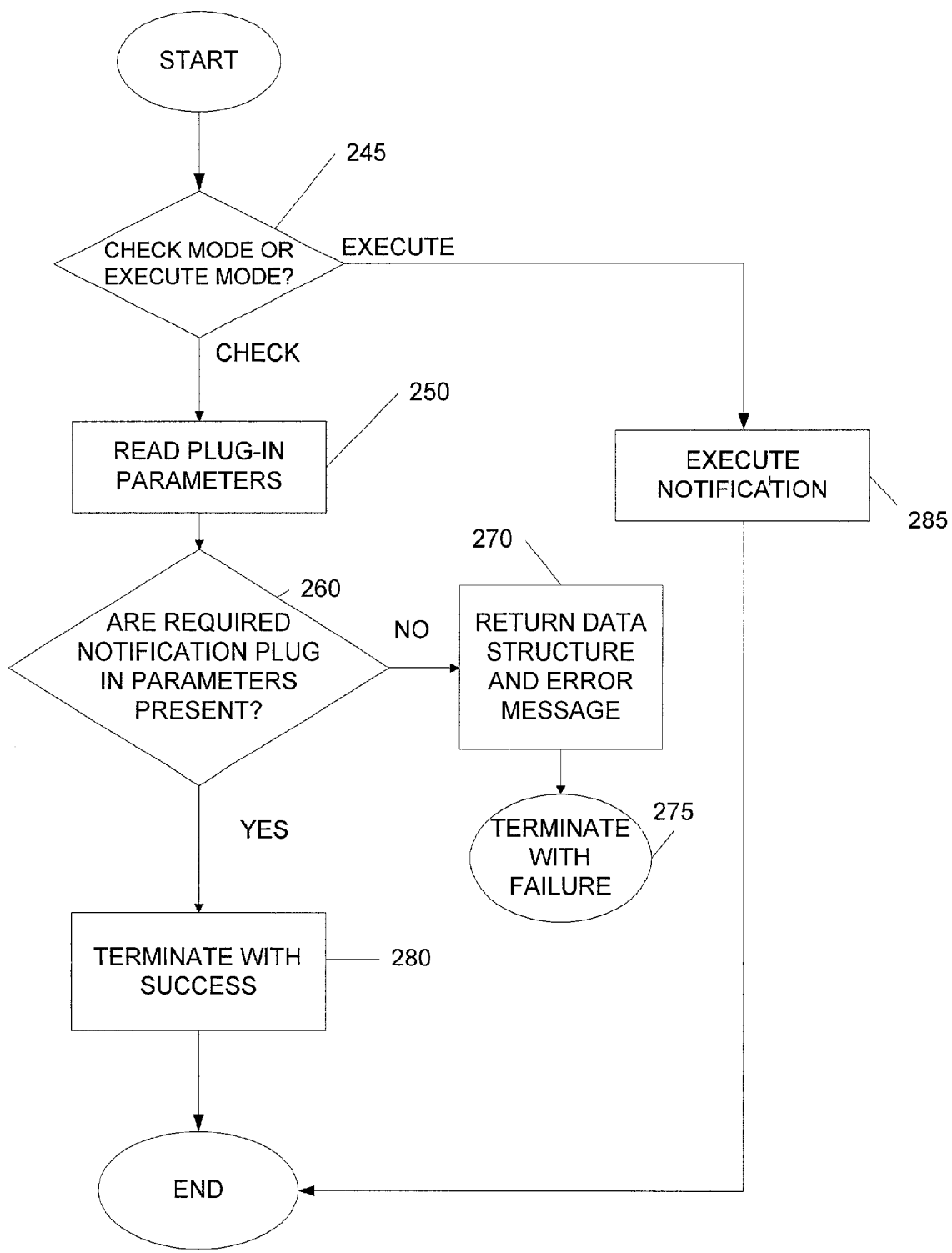

Referring to FIG. 4, the notification plug-in 30 first determines whether the notification plug-in 30 is being called in check mode or execute mode (step 245). If the notification plug-in 30 is called in check mode, the notification plug-in 30 then reads the parameters that had been specified when the computer operation 15 was first invoked (step 250). The notification plug-in 30 first checks the mode flag to see whether the notification plug-in 30 is checking for notification plug-in parameters or actually performing notification. The plug-in 30 will then look for any required notification plug-in parameters among the plug-in parameters (step 260) and will transmit an error message to the computer operation 15 if any required notification plug-in parameters are not properly specified (step 270). As with the authorization plug-in 20, the computer operation 15 will transmit any error message received from the notification plug-in 30 directly to the user. The notification plug-in 30 will then terminate with failure, and signal this failure to the computer operation (step 275) in the same way as the authorization plug-in 20 does. As with the authorization plug-in 20, the notification plug-in 30 may also return a data structure that indicates which parameters are missing. The computer operation 15 may similarly read this data structure and prompt the user for the missing parameters, or alternately, may simply display an error message and terminate. On the other hand, the notification plug-in 30 will terminate with success if the proper notification plug-in parameters have been specified (step 280).

Returning again to FIG. 2 once the notification plug-in 30 has been run in check mode, the computer operation 15 runs the computer operation code 50, which performs the substantive function of the computer operation 15 (step 160). The computer operation 15 executes the computer operation code 50 because the proper authorization will have been granted, and the proper notification plug-in parameters will have been provided for notifying one or more parties designated by the customer after executing the computer operation code 50. The computer operation 15 will return any errors generated by the computer operation code 50 itself, but if no errors are present, the computer operation 15 will proceed to execute the notification plug-in 30 in execute mode (step 170). The error messages from the computer operation code 50 may also be forwarded to the notification plug-in 30 in order to notify the appropriate parties of any errors.

Returning to FIG. 4, the notification plug-in 30 will first check whether the plug-in is being run in check mode or execute mode (step 245), and if in execute mode, the notification plug-in 30 will notify the appropriate persons or groups (step 285) in the manner that the customer has specified in the notification plug-in 30. The notification plug-in 30, like the authorization plug-in 20, will return any errors that occur for the computer operation 15 to display so that the user will know whether the notification plug-in 30 terminated with success or failure. The notification plug-in 30 will then end and return to the computer operation 15.

Returning again to FIG. 2, the computer operation 15 ends once the notification plug-in 30 has run in execute mode (step 180). The computer operation code 50, and thus the computer operation 15, presumably has been executed with proper authorization and with proper notification in ways that meet the customer's business or organizational needs.

The customer designs and develops the notification plug-in 30, just as the customer designs the authorization plug-in 20. Consequently, the customer can tailor the notification plug-in 30 to conform to the customer's notification policies or protocols. Some customers, for example, may designate their computer capacity planning group to be notified while other customers may designate require an accounting group to be notified of any changes. A customer may also designate the authorizing party for notification. The customer may design the notification message that is ultimately transmitted by the notification plug-in 30, as well as the means (e.g., e-mail, ftp) for conveying the notification. As with the authorization plug-in 20, the notification plug-in 30 may communicate to the computer operation 15 that the notification plug in 30 terminated with either failure or success, and as noted above, may also provide a data structure for specifying missing parameters. The notification plug-in 30 may also be designed to not require parameters but rather have a party to be notified hard-coded into the notification plug-in 30.

If the computer operation 15 had activated an iCOD processor, for example, the notification plug-in 30 might inform a manager that an iCOD processor had been activated, and might note that the newly activated processor would cost an additional sum of money. In this way, the manager would be aware of changes to the system, particularly those changes that have budgetary impact.

The authorization plug-in 20 can be implemented in any fashion provided it meets the API requirements for check/execute mode, data structure, error messages and termination as noted above. However, in one embodiment, the authorization plug-in 20 may be synchronized or linked with a license key generation tool so that an authorizing party can generate a key for the computer user to enter as a means of granting authorization. The key may be generated by any number of known license key algorithms, including generating a key based on the day, date or type of operation, or some combination of all three. The authorizing party, who is often not a system administrator, may run software to generate a license key that would eventually be given to the user of the computer operation 15. The software can be made as user-friendly as necessary, depending on the technical skill of the authorizing party.

The computer operation user, who often is a system administrator, would then enter this license key when executing the computer operation 15, where the license key would be passed to the authorization plug-in 20 as one of the required plug-in parameters. The authorization plug-in 20 would also have access to the license key generation tool and be able to grant or deny permission based on checking the key. Alternately, the authorization plug-in 20 could run the same algorithm with the same inputs as the license key generation tool in order to verify whether or not the particular license key holder was authorized to execute the computer operation 15. Similarly, the computer operation user could enter a password, where the authorization plug-in 20 would contact an authorizing authority and determine whether the password matches a required password.

The authorization plug-in 20 may also be implemented without using plug-in parameters. The authorization plug-in 20 may determine the identity of the computer 10 from system identification information and query an authorization server (not shown) regarding whether execution of the computer operation 15 is authorized for the computer 10. The authorization plug-in 20 would then receive either approval or denial of authorization for the computer operation 15 from the authorization server.

While the invention has been described with reference to the above embodiments, it will be appreciated by those of ordinary skill in the art that various modifications can be made to the structure and function of the individual parts of the system without departing from the spirit and scope of the invention as a whole.

What is claimed is:

1. A method for regulating execution of a computer operation, comprising:
   reading one or more parameters specified with the computer operation;
   determining if the computer operation requires a plug-in and if not, executing the computer operation, wherein the at least one plug-in comprises an authorization plug-in;
   if the computer operation requires at least one plug-in, filtering any required plug-in parameters from the one or more parameters specified with the computer operation;
   determining whether all required plug-in parameters for the at least one plug-in have been specified;
   terminating the at least one plug-in with failure if not all the required plug-in parameters have been specified;
   executing the at least one plug-in if all the required plug-in parameters have been specified, comprising attempting to obtain authorization for executing the computer operation, wherein obtaining authorization includes checking to see whether a value of at least one required plug-in parameter matches a value of at least one authorization parameter, and wherein the at least one authorization parameter is generated using a license key generating tool, and
   executing the computer operation if the at least one plug-in terminates with success, wherein the at least one plug-in regulates execution of the computer operation.

2. The method of claim 1, wherein at least one plug-in requires at least one plug-in parameter.

3. The method of claim 1, further comprising passing an error message to the computer operation indicating which of the required plug-in parameters have not been specified.

4. The method of claim 1, further comprising passing a data structure to the computer operation indicating which of the required plug-in parameters have not been specified.

5. The method of claim 4, further comprising prompting a user of the computer operation for the required plug-in parameters that had not been specified based on the data structure.

6. The method of claim 1, further comprising terminating the authorization plug-in with failure if authorization was not successfully obtained, thereby terminating the computer operation.

7. The method of claim 1, wherein executing at least one plug-in further comprises executing a notification plug-in.

8. The method of claim 7, further comprising determining whether all of the plug-in parameters required by the notification plug-in are specified before the computer operation and executing the notification plug-in after execution of the computer operation, whereby the computer operation is not executed if the notification plug-in terminates with failure after determining whether all of the plug-in parameters are specified.

9. The method of claim 7, wherein executing the notification plug-in further comprises notifying a party designated for notification.

10. A computing device, comprising:
    means for receiving at least one specified computer operation parameter;
    at least one plug-in that performs a regulatory function and that terminates with either success or failure;
    means for operating the at least one plug-in a check mode; and
    means for operating the at least one plug-in in an execute mode,
    wherein a computer operation will execute only if the at least one plug-in terminates with success, wherein at least one plug-in is authorization plug-in, and wherein the authorization plug-in links to a license key generation tool controlled by an authorization party so that the authorization plug-in grants authorization only if the system application is executed with a parameter specifying a license key generated by that tool.

11. The computing device of claim 10, wherein the computer operation determines which of the specified computer operation parameters is a plug-in parameter and passes all specified plug-in parameters to the at least one plug-in.

12. The computing device of claim 10, wherein the at least one plug-in requires at least one required plug-in parameter.

13. The computing device of claim 12, wherein the at least one plug-in determines whether any required plug-in parameters are among the specified plug-in parameters.

14. The computing device of claim 13, wherein the at least one plug-in has a check mode in which the plug-in is executed to only check for the at least one required plug-in parameter.

15. The computing device of claim 13, wherein the at least one plug-in generates at least one error message to be returned to the computer operation indicating that at least one required plug-in parameter was not specified.

16. The computing device of claim 13, wherein the at least one plug-in passes a data structure to the computer operation, whereby the data structure contains the plug-in parameters that were not specified.

17. The computing device of claim 13, wherein the computer operation prompts a user to enter at least one required parameter that was not specified.

18. The computing device of claim 10, wherein the at least one plug-in has an execute mode in which the execute mode causes the plug-in to perform the regulatory function of the plug-in.

19. The computing device of claim 14, wherein the computer operation passes a mode flag to the at least one plug-in indicating whether to check for the at least one required plug-in parameter.

20. The computing device of claim 10, where the authorization plug-in determines if authorization is granted by querying an authorization server to see if the computer is authorized to perform the computer operation.

21. The computing device of claim 10, wherein at least one plug-in is a notification plug-in and has means for notifying a party that the computer operation has been executed.

* * * * *

UNITED STATES PATENT AND TRADEMARK OFFICE
CERTIFICATE OF CORRECTION

| | |
|---|---|
| PATENT NO. | : 7,287,277 B2 |
| APPLICATION NO. | : 10/023811 |
| DATED | : October 23, 2007 |
| INVENTOR(S) | : Edgar Circenis |

Page 1 of 1

It is certified that error appears in the above-identified patent and that said Letters Patent is hereby corrected as shown below:

In column 2, line 42, delete "patties" and insert -- parties --, therefor.

In column 8, line 5, after "plug-in" insert -- 30 --.

In column 10, line 28, in Claim 10, after "plug-in" insert -- in --.

Signed and Sealed this

Twenty-second Day of July, 2008

JON W. DUDAS
*Director of the United States Patent and Trademark Office*